June 27, 1933. E. J. HOTCHKISS 1,915,493
FLUID FLOW CONTROL
Filed Dec. 6, 1928
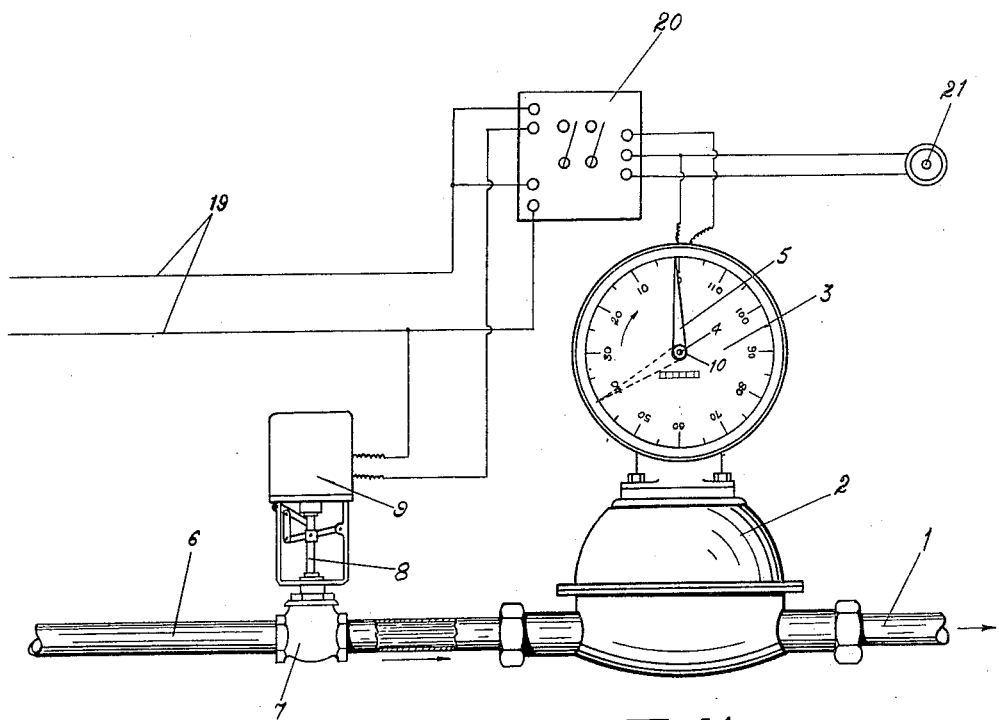
Fig.1
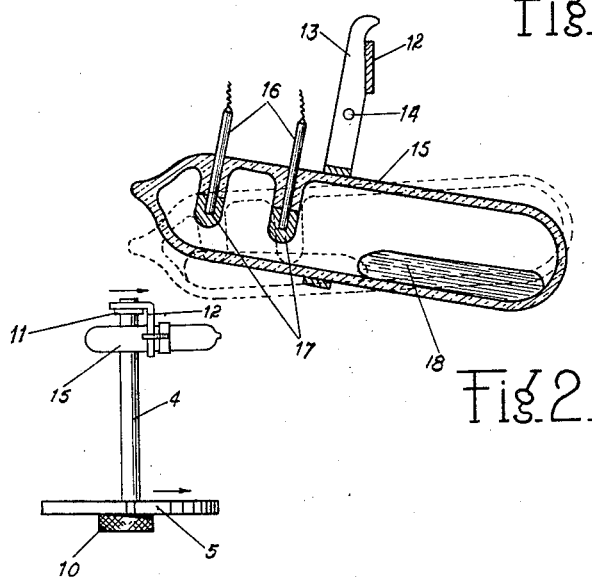
Fig.2
Fig.3
INVENTOR.
EDGAR J. HOTCHKISS.
BY Philip S. Hopkins
ATTORNEY Patented June 27, 1933

1,915,493

UNITED STATES PATENT OFFICE

EDGAR J. HOTCHKISS, OF BINGHAMTON, NEW YORK

FLUID FLOW CONTROL

Application filed December 6, 1928. Serial No. 324,270.

My invention relates generally to a fluid flow control and specifically to a means and apparatus for measuring and governing the flow of a fluid such as water through a delivery pipe, with great accuracy and convenience.

My improved fluid control and measuring device is particularly adaptable for use in bakeries and other establishments where definite measured quantities of water are used for mixing purposes, and where heretofore it has been generally necessary to provide large reservoir tanks for storing a supply of water, provided with control means for properly delivering the water from the tank to the mixer. Such a method requires considerable and cumbersome apparatus and is in no sense sanitary, convenient nor accurate in operation. Furthermore, such a means requires the almost constant attention of an operator. I have by my invention provided a simple, small and effective fluid flow controlling device which is practically automatic in its operation, and which governs the flow of fluid with the accuracy necessary in such operations as dough mixing, etc. Of course, it will be understood that I do not limit my invention to the use here indicated, although it is peculiarly adaptable to that purpose. Obviously, it is also susceptible to wide usage in other arts as well.

Another object of my invention is to provide a controlling means of the class described wherein the operator by making one adjustment or setting operation and manually closing a circuit, starts the delivery of fluid, and after an exact predetermined amount has been delivered, the fluid flow will be automatically stopped.

Other objects and advantages in details of construction and operation will be apparent as the description now proceeds, reference being had to the figures of the accompanying drawing wherein like reference numerals indicate like parts.

In the drawing:—

Figure 1 is a side view, partly diagrammatic, illustrating the assembly of my invention.

Figure 2 is a detail rear sectional view showing a type of circuit maker and breaker which may be conveniently and satisfactorily used with my invention.

Figure 3 is a detail top plan view of the controlling means for the circuit maker and breaker, many parts being omitted for the sake of clearness.

The reference numeral 1 indicates a fluid supply pipe leading from any suitable source of supply such as an ordinary water main. This supply pipe passes into a fluid meter 2 of any well known and desired construction, effective for measuring the amount of fluid passing therethrough. The structural details of this meter have been omitted as they form no part of this invention. Suffice it to say that the dial 3 of the meter is graduated in units applicable to the particular use for which the device is being applied, such as for instance pounds, gallons, etc. The usual dial shaft 4 is provided on its front projecting end with a pointer 5 movable over the dial 3, as the device is operated, to indicate in cooperation with the graduations on the dial, the amount of fluid passing through the meter. Obviously this dial shaft 4 is suitably driven from the meter 2, and is so arranged that it may be freely turned or moved in one direction, that is counter clockwise in Figure 1, but will be positively driven by the meter in the opposite direction. The purpose of this will presently be described.

Suitably positioned adjacent the meter 2 and in the fluid delivery pipe 6 passing out of the meter 2, is a valve housing 7 within which is suitably arranged a control valve which upon proper actuation of the valve stem 8 controls the passage of the fluid through the delivery pipe 6. The controlling means for this valve stem 8 and the valve comprises a solenoid 9 electrically operated in a manner to be described and the details of which have been omitted as they form no part of this invention. Suffice it to say that upon energizing the solenoid 9, the valve will be opened to permit the flow of fluid through the delivery pipe 6 and upon deenergizing such solenoid, the valve will be closed and the flow of fluid stopped. Normally the solenoid is deenergized and the valve closed.

The dial shaft 4, which is provided on its extreme front end with a thumb piece 10 for the purpose of manually turning the same, is provided at its rear end with an upstanding arm 11 in alignment with the pointer 5. This arm 11 has secured to its upper end an angle bracket 12 lying in the path of, and adapted to engage with and operate the upper end of a supporting arm 13, pivoted intermediate its ends as at 14, and swingably supporting at its lower end a mercury circuit maker and breaker 15, shown clearly in Figure 2. This circuit maker and breaker includes in addition to the casing 15, preferably of glass, a pair of contact members 16 passing into the casing 15 and provided at their inner ends with lead points 17. Within the casing 15 is a quantity of mercury 18, which when the device is swung or tilted to the position shown in dotted lines 2, moves into engagement with both of the lead points 17 and thus establishes an electric conduit or conductor between the contacts 15. It will be noted that the supporting arm 13 engages the switch or circuit maker and breaker casing 15 at a point beyond the center thereof, whereby the weight of the mercury 18 normally swings and maintains the circuit maker and breaker in the position shown in full lines in Figure 2 and with the circuit between the contacts 16 open.

A source of electricity such as an ordinary line current 19 is delivered to an electric relay board or panel 20 of any suitable construction, designed, when set in operation by the push button switch 21, to energize the solenoid 9, and when operated by the circuit maker and breaker 15, to deenergize the solenoid.

The operation of my invention is briefly as follows:—

It being desired that the operator deliver for instance 40 pounds of water through the delivery pipe 6, he first turns the shaft 4 by means of the thumb piece 10, bringing the pointer 5 counter clockwise on the dial 3 to the graduation 40. Obviously, this movement also brings the arm 11 on the opposite end of the shaft 4 to a like position with respect to the circuit maker and breaker which is positioned on or adjacent to the meter at the zero point. When this setting has been made, the operator presses the button 21 which actuates the relay 20 to close the circuit and energize the solenoid 9 which results of course in moving the valve stem 8 and opening the valve to permit the flow of fluid through the delivery pipe. Obviously, as the operation of the meter is dependent upon the flow of fluid, immediately as the fluid starts to flow, the meter operates and during its operation the shaft 4 and consequently the pointer 5 and arm 11 move clockwise back toward the zero point on the dial 3. When the 40 pounds of fluid have been delivered or passed through the pipe, obviously the arm 11 will have returned to the zero position where it engages the upper end of the supporting arm 13, resulting in swinging said arm upon its pivot, and tilting the contact maker and breaker 15 so that the mercury therein will close a circuit between the contacts 16 and such circuit, shunted through the relay 20, causes the solenoid 9 to be deenergized and the valve stem 8 and its valve returned to closed position, cutting off the flow of fluid through the delivery pipe.

Details of construction of the relay device 20 have been omitted as they form no part of this invention other then in the combination hereinafter claimed, and such devices are well known and available on the market. Obviously with an electric relay control of this character, if the source of electric current 19 should fail for any reason, the solenoid 9 will be deenergized and the valve closed.

Of course, many changes may be made in details of construction and arrangement of parts without departing from the spirit and scope of my invention. I do not limit myself therefore, to the exact form herein shown and described other than by the appended claim.

I claim:—

A fluid flow controlling device comprising in combination a fluid delivery pipe, a meter for registering the fluid flow therethru, a valve in said pipe for controlling the fluid flow therethru, setting means on said meter for predetermining the amount of fluid flow comprising a pointer shaft and a pointer operable thereby, said pointer being manually movable in one direction for the setting operation and movable in the opposite direction by the operation of said meter, means for opening said valve, and means operated by said pointer when the predetermined amount of flow is reached for automatically closing said valve, said last named means comprising an electric circuit maker and breaker movable to circuit closing position by operation of said pointer to one position, and electric valve operating means controlled by said circuit maker and breaker.

In testimony whereof, I affix my signature.

EDGAR J. HOTCHKISS.